United States Patent Office 3,736,313
Patented May 29, 1973

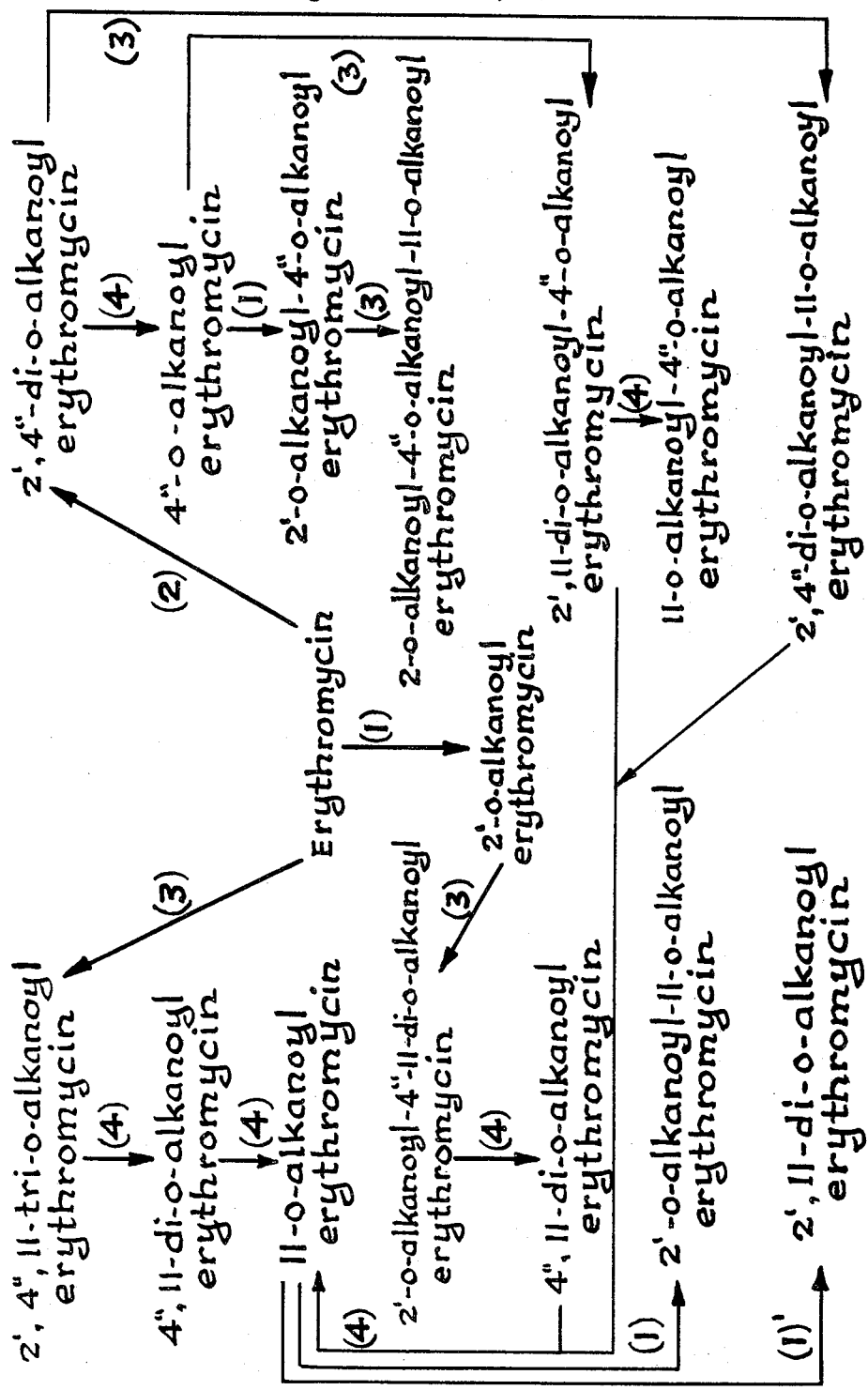

3,736,313
ERYTHROMYCIN DERIVATIVES
Peter Hadley Jones, Lake Forest, and Thomas John Perun, Libertyville, Ill., assignors to Abbott Laboratories, North Chicago, Ill.
Continuation of abandoned application Ser. No. 821,016, May 1, 1969. This application Feb. 26, 1971, Ser. No. 119,418
Int. Cl. C07c 129/18
U.S. Cl. 260—210 E      7 Claims

ABSTRACT OF THE DISCLOSURE

The 2′,4″-di-O-alkanoyl and the 2′,4″,11-tri-O-alkanoyl derivatives of erythromycin are prepared by esterification fo erythromycin with an appropriate acid anhydride. These resulting ester derivatives are initially de-esterified in the 2′-position to prepare the 4″-O-alkanoyl or the 4″,11-di-O-alkanoyl erythromycin, and then, if desired, these de-esterification products are reacted with another acid anhydride to prepare a dissimilarly di-substituted or tri-substituted ester. Through repetitive esterification and de-esterification, combinations of the mono substituted and the similarly or dissimilarly multiple substituted erythromycin esters are prepared. These compounds have antibiotic activity.

DESCRIPTION OF INVENTION

This is a continuation of S.N. 821,016, filed May 1, 1969, now abandoned, and relates to novel esters of the antibiotic erythromycin that possess antibiotic activity. In particular, this invention relates to novel lower-O-alkanoyl derivatives of erythromycin. As used herein, the term "lower-O-alkanoyl" includes the radicals formyl, acetyl, propionyl, and butyryl, and further indicates that the alkanoyl radical is bonded to the erythromycin moiety through an oxygen atom of the erythromycin moiety, yet specifically excludes peroxide bonding.

Erythromycin is produced in two forms denoted A and B by cultivating a strain of *Streptomyces erythreus* in a suitable nutrient medium as is taught in U.S. 2,653,899, Bunch et al. The structure of erythromycin is represented by the following formula:

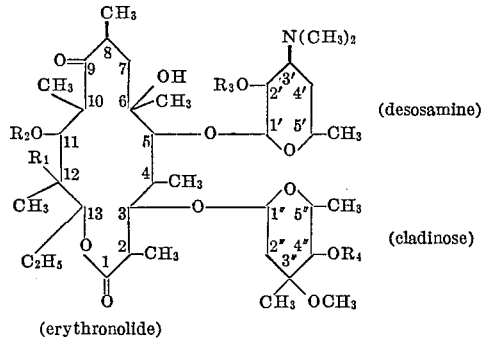

(erythronolide)

In this formula, when $R_2$, $R_3$ and $R_4$ represent hydrogen and $R_1$ represents hydroxyl, the structure illustrated is erythromycin A. When $R_1$ is, however, also hydrogen, the structure of erythromycin B is illustrated. The term "erythromycin" when used herein without modification is meant to embrace both forms, that is erythromycin A and erythromycin B.

Erythromycin, as will be noted from the formula, comprises three cyclic fragments. These fragments are referred to respectively as cladinose, desoamine and erythronolide. The positions on the cladinose ring are indicated by double primed numbers; the positions on the desosamine ring by single primed numbers; while positions on the erythronolide ring are indicated by unprimed numbers. In the present invention, substitution takes place at the 2′, the 4″, and the 11-positions.

Esterification of the 2′-hydroxyl group and the 2′,4″-hydroxyl groups of erythromycin has heretofore been accomplished. The novel derivatives of this invention comprise those esters wherein a loweralkanoyl is introduced either only into the 11-position, or only into the 4″-position; or into both the 4″ and 11-positions or the 2′ and 11-positions or the 2′, 4″, and 11-positions. In other words, referring to the formula, $R_2$, $R_3$ and $R_4$, are selected from the group consisting of loweralkanoyl, that is formyl, acetyl, propionyl, and butyryl, and hydrogen, such that neither $R_2$ or $R_4$ are simultaneously hydrogen, when $R_3$ is loweralkanoyl, nor is $R_2$ hydrogen when $R_3$ and $R_4$ are loweralkanoyl.

When the derivatives include compounds having multiple substitution, the substituents can be alike or they can be different. In this specification, when the substituents are alike, this fact is indicated by having the prefix di- or tri- precede the generic term O-alkanoyl or the name of the radical, thus for example, 2′,11-di-O-alkanoyl erythromycin and 2′,11-di-O-acetyl erythromycin. When, however, the substituents are not alike, this is indicated by repeating the generic term O-alkanoyl after the designation of the position occupied or in the instance of a particular compound, naming the radicals, for example 2′-O-alkanoyl-11-O-alkanoyl erythromycin and 2′-O-acetyl-11-O-formyl erythromycin.

The first step in preparing the compounds of this invention is to react erythromycin with acid anhydride. As shall be explained later, the site of substitution is controlled by the nature of catalyst present, together with variation in reaction conditions. Furthermore, if the formyl derivative is desired, the mixed formic acetic anhydride must be used. The formic anhydride is known to exist only at −78° C., but the formic moiety of the formic acetic mixed anhydride is so reactive that it behaves in this reaction scheme as though it were formic anhydride. Excepting formylation, however, in all other preparations, a symmetrical anhydride is used in preference to a mixed anhydride. The mixed anhydride is undesirable because it yields a mixture of derivatives making separation into individual O-alkanoyl erythromycin derivatives difficult.

The ease of esterification in order of increasing difficulty is 2′≫4″>11. In fact, the 2′-esters form with such ease that selective initial esterification of only the 4″ or 11-positions without also esterifying the 2′-position has not yet been achieved.

When the desired product cannot be formed by a single step esterification procedure, it is necessary to first form the 2′,4″-di-O-alkanoyl or the 2′,4″,11-tri-O-alkanoyl followed by a partial de-esterification through hydrolysis or alcoholysis.

The ease of hydrolysis of 2′-O-alkanoyl-4″-O-alkanoyl-11-O-alkanoyl erythromycin is rated in order of increasing difficulty as 2′≫4″>11 and formyl>other alkanoyls. In fact an ester other than formyl present at the 11-position is so stable that it can only be hydrolyzed at the risk of rupturing the erythronolide ring. The 11-O-formyl erythromycin can be deesterified by extended hydrolysis, but to no real purpose since any ester substituents at the 2′ or 4″-positions are also hydrolyzed thus against obtaining the completely de-esterified alcohol, erythromycin. Esters at the 4″-position other than formyl, are also very difficult to hydrolyze. Therefore, if the 4″-position is to be esterified only to serve as a blocking group and it is intended to later remove the ester during the course of the reaction procedure, it is preferable that formyl be used because of its easy removal. No ester in the 4″-position can really be removed without also removing any ester present at the 2′-position.

After 2′,4″ - di - O - alkanoyl and the 2′,4″,11-tri-O-alkanoyl derivatives are prepared by esterification with an appropriate acid anhydride, and atfer these resulting esters are then de-esterified in the 2′-position to prepare the 4″-O-alkanoyl, or the 4″,11-di-O-alkanoyl erthromycin, the desterification products can then be reacted with another acid anhydride to prepare a dissimilarly di-substituted or trisubstituted ester. Through repetitive esterification and deesterification, all combinations of the mono substituted and similarly and dissimilarly multiple substituted erythromycin esters are prepared. A clearer understanding of the reaction scheme can be had by reference to the accompanying drawing which is a flow chart illustrating the reaction scheme for preparing the compounds of this inventen. In the drawing, four types of reactions respectively enumerated (1), (2), (3), and (4) are set forth, in which:

Reaction type (1) indicates the reaction of erythromycin or an erythromycin ester derivative to install an ester only into the unsubstituted 2′-position without affecting the 11 or the 4″-positions;

Reaction type (2) indicates the reaction of erythromycin to install an ester only into the 2′ and 4″-positions without affecting the unsubstituted 11-position;

Reaction type (3) indicates the reaction of erythromycin or an erythromycin ester derivative to install an ester into the unsubstituted 11-position; and incidentally also into the 2′ or 4″-positions if they also are unsubstituted; and Reaction type (4) indicates the hydrolysis of a 2′ or a 4″-ester.

Referring to the drawing, erythromycin can be reacted with acid anhydride according to reaction type (1) in which no catalyst is added. Under those conditions esterification of erythromycin or erythromycin derivatives having a hydroxyl group available in the 2′-position proceeds only at the 2′-position. This is because this reaction is self catalyzed by the proximity of the tertiary amine at the 3′-position.

Erythromycin also can be reacted with acid anhydride using an additional catalyst, as in reaction type (2). The esterification is carried out at room temperature for from 12–72 hours, and under these conditions O-alkanoyl will be introduced into the available 2′ and 4″-positions of erythromycin or an erythromycin derivative. "Available" means having hydroxyl radicals at the 2′ and 4″-positions.

In the case of esterification of erythromycin B, the catalyst can be a tertiary amine, of which pyridine is preferred. When esterifying erythromycin A, on the other hand, pyridine is operative in the formylation of erythromycin A, but when introducing acetyl, propionyl, or butyryl into the 2′ and 4″ or for that matter into the 2′, 4″ and 11-positions, it is preferable to use 1,4″-diazabicyclooctane, or N-methylpyrrolidine as a catalyst.

Erythromycin can also be reacted with acid anhydride using the additional catalysts described above, the according to reaction type (3). This esterification reaction is carried out for from 3–10 days and preferably about 7 days, at room temperature. Under these conditions, O-alkanoyl will be introduced into the available 2,4″- and 11-positions of erythromycin or an erythromycin derivative.

Reaction (1)′ merely indicates that unlike (1), the same acid anhydride as was used to prepare the 11-O-alkanoyl erythromycin is reacted with this compound to prepare the 2′,-11-di-O-alkanoyl erythromycin.

The hydrolysis reaction (4) is carried out as are the hydrolysis of known esters.

Following the sequence of reactions down the right hand column of the drawing, after erythromycin has been reacted for a period of 12–72 hours in the presence of a suitable catalyst, and the 2′,4″-di-O-alkanoyl erythromycin is produced, it can either be subjected to mild hydrolysis to hydrolyze the 2′-ester and produce 4″-O-alkanoyl erythromycin or it can be reacted with another acid anhydride to produce 2′,4″ - di-O-alkanoyl-11-O-alkanoyl erythromycin.

The 4″-O-alkanoyl erythromycin can be reacted without added catalyst to esterify the 2′-position followed by reaction with a different acid anhydride to esterify the 11-position. Alternatively, the 4″-O-alkanoyl erythromycin can be reacted in the presence of an added catalyst to obtain the 2′,11-di-O-alkanoyl-4″-O-alkanoyl erythromycin.

This latter product can be hydrolyzed to remove the 2′-O-alkanoyl and thereby produce 11-O-alkanoyl-4″-O-alkanoyl erythromycin.

Turning to the left hand column of the drawing, 2′,4″-11-tri-O-alkanoyl is produced by the reaction of erythromycin and acid anhydride over an extended period with a suitable catalyst.

The 2′-ester can be hydrolyzed to produce the 4″,11-di-O-alkanoyl erythromycin. In case of the 4″,11-di-O-formyl erythromycin, it can further be hydrolyzed to the 11-formyl erythromycin, stopping short, of course, of reconstituting erythromycin.

A more generally applicable and preferred method for preparing 11-O-alkanoyl erythromycin is to proceed on in the right hand column to prepare 4″-O-formyl erythromycin. This is then esterified with acid anhydride in the 2′ and 11-positions to form the 2′,11-di-O-alkanoyl-4″-formyl erythromycin which in turn is hydrolyzed to the 11-O-alkanoyl. Alternatively, the 2′,4″-di-O-formyl erythromycin can be esterified in the 11-position as with a type (3) reaction. The 2′,4″-di-O-formyl-11-O-alkanoyl erythromycin is then hydrolyzed to the 11-O-alkanoyl erythromycin, the 2′ and 4″ formyl esters hydrolyzing readily.

The 11-O-alkanoyl can be reacted without adding additional catalyst with the same acid anhydride used originally to produce to 11-O-alkanoyl according to reaction type (1)′ to get the 2′,11-di-O-alkanoyl erythromycin or a different acid anhydride to get according to (1) the 2′-O-alkanoyl-11-alkanoyl erythromycin.

To produce the 2′-O-alkanoyl-4″-11-di-O-alkanoyl erythromycin one proceeds from the 2′-ester to esterify the 4″ and 11-positions according to a type (3) reaction which then can be hydrolyzed to the 4″,11-di-O-alkanoyl erythromycin.

Reference to the following specific examples will further serve to illustrate the foregoing reaction scheme.

EXAMPLE 1

2′,4″-di-O-acetyl erythromycin A

To a solution of erythromycin A (7.3 g., 1 millimole) and 1,4-diazabicyclooctane [2,2,2](Dabco) (7.3 g., 6.5 millimoles) dissolved in 100 ml. of dry ether was added 20 ml. (0.2 mole) of acetic anhydride. The resulting solution was stirred at room temperature for 48 hours. The mixture was then poured into 500 ml. of cold sodium carbonate and 250 ml. of ether. The ether layer was washed three times with cold sodium bicarbonate and once with water. After drying over sodium sulfate, the ether was removed to yield 7.0 g. (86%) of the diacetate, M.P. 139–144°.

Analysis.—Calcd. for $C_{41}H_{71}NO_{15}$ (percent): C=60.20; H=8.75; N=1.71; O=29.34. Found (percent): C=59.91; H=8.73; N=1.90; O=29.59.

EXAMPLE 2

4″-O-acetyl erythromycin A

2′,4″-di-O-acetyl erythromycin A (5.0 g.) was dissolved in 100 ml. of methanol and 100 ml. of 5% sodium bicarbonate. The solution was stirred at room temperature for 24 hours. The methanol was removed under reduced pressure with ether. The combined ether extracts were dried over sodium sulfate and the ether removed to yield 4.5 g. (95%) of product, M.P. 135–142°.

Analysis.—Calcd. for $C_{39}H_{69}NO_{14}$ (percent): C=

60.36; H=8.96; N=1.82; O=28.82. Found (percent): C=60.38; H=9.20; N=1.60; O=28.87.

EXAMPLE 3

2',4''-di-O-formyl erythromycin A

To a solution of 7.3 g. (1.0 millimole) of erythromycin A dissolved in 250 ml. of ether and 5 ml. of pyridine was added at 0°, 16 ml. (0.18 mole) of formic acetic anhydride [prepared by the method of I. Muramatsu, Bull. Chem. Soc. Jap., 38, 255 (1965)]. The solution was stirred at 0° for 3 hours and at room temperature for 2 hours. The reaction mixture was again cooled to 0° and poured into cold 10% sodium carbonate. The ether layer was washed three times with cold 2% sodium bicarbonate and once with water. After drying over sodium sulfate and removing the ether 7.5 g. (95%) of product was obtained, M.P. 128–132°.

Analysis.—Calcd. for $C_{39}H_{67}NO_{15}$ (percent): C=59.30; H=8.55; N=1.77; O=30.38. Found (percent): C=59.39; H=8.70; N=1.68; O=30.66.

EXAMPLE 4

4''-O-formyl erythromycin A

To a stirring solution of 7.9 g. (1.0 millimole) of 2',4''-di-O-formyl-erythromycin A dissolved in 100 ml. of acetone was added 100 ml. of 5% sodium bicarbonate. After stirring for 1.5 hours, the acetone was removed at reduced pressure and the aqueous layer extracted with methylene chloride. The methylene chloride extract was washed with water and dried over sodium sulfate. Removal of the solvent yielded 7.5 of a glass which was crystallized twice from ether to yield 6.3 g. (83%) of product, M.P. 147–150°.

Analysis.—Calcd. for $C_{38}H_{67}NO_{14}$ (percent): C=59.90; H=8.87; N=1.84; O=29.40. Found (percent): C=59.82; H=8.91; N=1.80; O=29.62.

EXAMPLE 5

2'-O-acetyl-4''-O-formyl erythromycin A

To a suspension of 3 g. of potassium carbonate in a solution of 7.6 g. (1.0 millimole) of 4''-O-formyl erythromycin A and 100 ml. of acetone was added 2.1 ml. (21 millimoles) of acetic anhydride. After stirring for 4 hours at room temperature, the mixture was poured into a cold solution of 10% potassium carbonate and ether. The ether layer was washed twice with cold 5% sodium bicarbonate and once with water. After drying over sodium sulfate and removing the solvent, 8.2 g. of a pale glass was obtained. Two crystallizations from cyclohexane yielded, 5.4 g. (67%) of product, M.P. 120–125°.

Analysis.—Calcd. for $C_{40}H_{69}NO_{15}$ (percent): C=59.75; H=8.65; N=1.74; O=29.85. Found (percent): C=59.50; H=8.85; N=1.93; O=28.67.

EXAMPLE 6

2',4''-di-O-acetyl erythromycin B

Erythromycin B (5.0 g.) was dissolved in 125 ml. of pyridine and 5 ml. of acetic anhydride was added. The solution was allowed to stand under a drying tube for 3 days, then poured into 500 ml. of ice-water. The pH was adjusted to 8–9 by the addition of 5 g. of sodium hydroxide in 25 ml. of water, and the cold solution was extracted with two portions of ether. The combined extracts were dried over sodium sulfate and evaporated. The residue was dissolved in benzene and the solution evaporated to remove residual pyridine. The glassy solid obtained was crystallized from a small amount of ether yielding 1.5 g., M.P. 220–225°. A second crop was 1.4 g., M.P. 212–216°. Another recrystallization of the second crop from methylene chloridehexane gave 1.3 g. of product, M.P. 220–224°. The total yield was 50%.

Analysis.—Calcd. for $C_{41}H_{71}NO_{14}$ (percent): C=61.40; H=8.92; N=1.75; O=27.93. Found (percent): C=61.63; H=9.03; N=1.81; O=27.88.

EXAMPLE 7

4''-O-acetyl erythromycin B

A solution of 1.3 g. of 2',4''-di-O-acetyl erythromycin B in 50 ml. of anhydrous methanol was stirred at room temperature for 24 hours. The solution was evaporated to dryness and the residue crystallized from acetone yielding 0.75 g. (61%) of product, M.P. 125–130°.

Analysis.—Calcd. for $C_{39}H_{69}NO_{13}$ (percent): C=61.64; H=9.15; N=1.84; O=27.37. Found (percent): C=61.40; H=9.17; N=1.80; O=27.25.

EXAMPLE 8

2',4'',11-tri-O-acetyl erythromycin B

Erythromycin B (5.0 g.) was dissolved in 125 ml. of pyridine and 20 ml. of acetic anhydride was added. The solution was allowed to stand at room temperature under a drying tube for 7 days. The yellow solution was then poured into approximately 500 ml. of ice-water and 20 g. of sodium hydroxide in 100 ml. of water was added slowly to give a pH of 8–9. The cold solution was immediately extracted with three portions of ether, and the combined extracts were dried over sodium sulfate and evaporated. The residue was dissolved in benzene and evaporated to remove the residual pyridine. The glassy solid was taken up in ether and evaporated slowly until crystallization started. Successive coolings and concentrations of the solution gave 3.9 g. (66%) of product with double M.P. 125–135° and 191–193°.

Analysis.—Calcd. for $C_{43}H_{73}NO_{15}$ (percent): C=61.19; H=8.72; N=1.66; O=28.43. Found (percent): C=61.47; H=8.83; N=1.79; O=28.57.

EXAMPLE 9

4'',11-di-O-acetyl erythromycin B

A solution of 1.0 g. of 2',4'',11-tri-O-acetyl erythromycin B in 40 ml. of anhydrous methanol was allowed to stand at room temperature for 3 days. The solution was evaporated to dryness giving 0.95 g. of glassy solid product which resisted crystallization.

Analysis.—Calcd. for $C_{41}H_{71}NO_{14}$ (percent): C=61.40; H=8.92; N=1.75; O=27.93. Found (percent): C=61.65; H=9.24; N=1.71; O=28.15.

EXAMPLE 10

2',4'',11-tri-O-formyl erythromycin B

To a suspension of 12 g. (1.7 millimole) of erythromycin B in 450 ml. of ether and 17 ml. of pyridine at 0° was slowly added 53 ml. (0.6 mole) of formic acetic anhydride. The solution was stirred at 0° for 3 hours and at 25° for 5 days. The solution was again cooled to 0° and filtered under nitrogen to yield 2 g. of a crystalline solid product, M.P. 201–209°. One recrystallization from methylenechloride-hexane yielded 1.8 g. (12%) of the triformate ester as the methylene chloride solvate, M.P. 221–222°.

Analysis.—Calcd. for $C_{40}H_{67}NO_{15} \cdot CH_2Cl_2$ (percent): C=55.52; H=7.84; Cl=8.00; N=1.58; O=27.06. Found (percent): C=55.77; H=7.58; Cl=7.77; N=1.74; O=27.04.

The filtrate from the first filtration was poured into cold 5% sodium bicarbonate. The ether layer was washed twice with cold 5% sodium bicarbonate, once with water and dried over sodium sulfate. Removal of the ether yielded 11.3 g. of a glass which by thin layer chromatography was 75% of the 2',4'',11-triformate and 25% of the 2',4''-diformate. This mixture was used to prepare the compound of Example 11.

EXAMPLE 11

4'',11-di-O-formyl erythromycin B

The mixture (1.0 g.) of 2',4'',11-tri-O-formyl erythromycin B and 2',4''-di-O-formyl erythromycin B obtained from the previous example was dissolved in 200 ml. of acetone. To this solution was added 100 ml. of 5% sodium bicarbonate and the resulting mixture stirred at 25° for 1.5 hours. The acetone was removed at reduced pressure keeping the temperature below 25°. The aqueous layer was extracted three times with 150 ml. of methylene chloride. The combined extracts were washed once with water and dried over sodium sulfate. Removal of the solvent yielded 10 g. of a glass which upon fractional crystallization from ether yielded 2 g. (18%) of the 4″ formate ester, M.P. 134–139° and 6.5 g. (59%) of the 4″,11-diformate ester, M.P. 204–206°.

*Analysis.*—Calcd. for $C_{39}H_{67}NO_{14}$ (percent): C=60.52; H=8.73; N=1.81; O=29.94. Found (percent): C=60.28; H=8.46; N=1.79; O=28.70.

EXAMPLE 12

11-O-formyl erythromycin B

A solution of 6.2 g. (0.8 millimole) of 4″,11-di-O-formyl erythromycin B in 600 ml. of methanol was kept at 25° for six days. The methanol was removed under reduced pressure and the crystalline residue recrystallized from ethyl acetate to yield 5.0 g. (83%) of the formate ester, M.P. 130–140°.

*Analysis.*—Calcd. for $C_{38}H_{67}NO_{13}$ (percent): C=61.18; H=9.05; N=1.88; O=27.89. Found (percent): C=61.18; H=9.10; N=1.90; O=28.14.

EXAMPLE 13

2′,4″,di-O-formyl erythromycin B

To a suspension of erythromycin B 7.2, g., (1.0 millimole) in 250 ml. of ether and 6 ml. of pyridine at 0° was added 16 ml. (0.18 mole) of formic acetic anhydride. After stirring at 0° for 2 hours and 25° for 3 hours, the solution was poured into cold 5% sodium bicarbonate. The ether layer was washed twice with cold 5% sodium bicarbonate and once with water. After drying over sodium sulfate and removing the solvent, 7.3 g. of a glass was obtained. Two crystallizations from ether-hexane gave 6.1 g. (79%) of the diformate ester, M.P. 145–148°.

*Analysis.*—Calcd. for $C_{39}H_{67}NO_{14}$ (percent): C=60.52; H=8.73; N=1.81; O=28.94. Found (percent): C=60.32; H=8.66; N=1.73; O=29.04.

EXAMPLE 14

4″-O-formyl erythromycin B

2′,4″-di-O-formyl erythromycin B 7.7 g. (1 millimole) was dissolved in 100 ml. of acetone. To this solution was added 100 ml. of 5% sodium bicarbonate and the resulting suspension stirred at room temperature for 1.5 hours. The acetone was removed at reduced pressure keeping the temperature below 25°. The aqueous layer was extracted three times with 150 ml. of methylene chloride. The combined extracts were washed once with water and dried over sodium sulfate. Removal of the solvent yielded 7.5 g. of a glass which was crystallized twice from ether to yield 6.1 g. (82%) of the formate ester, M.P. 135–140°.

*Analysis.*—Calcd. for $C_{38}H_{67}NO_{13}$ (percent): C=61.18; H=9.05; N=1.88; O=27.89. Found (percent): C=61.10; H=9.20; N=1.71; O=27.80.

EXAMPLE 15

2′-O-acetyl-4″-O-formyl erythromycin B

To a suspension of 1.5 g. of potassium carbonate in a solution of 3.7 g. (0.5 millimole) of 4″-O-formyl erythromycin B and 100 ml. of acetone was added 2.5 ml. (25 millimoles) of acetic anhydride. After stirring for 4 hours at 25°, the mixture was poured into cold 5% sodium bicarbonate. The aqueous solution was extracted twice with 150 ml. of ether. The combined ether extracts were washed once with water and dried over sodium sulfate. The solvent was removed and the residue crystallized from methylene chloride-hexane yielding 3.4 g. (78%) of product as the methylene chloride solvate, M.P. 155–157°.

*Analysis.*—Calcd. for $C_{40}H_{69}NO_{14}\cdot CH_2Cl_2$ (percent): C=56.41; H=8.20; Cl=8.12; N=1.69. Found (percent): C=56.75; H=8.38; Cl=7.97; N=1.61.

EXAMPLE 16

2′,11,-di-O-acetyl-4″-O-formyl erythromycin B

4″-O-formyl erythromycin B (5.0 g.) was dissolved in 100 ml. of pyridine and 16 ml. of acetic anhydride was added. The solution was allowed to stand at room temperature under a drying tube for 10 days, then poured in 500 ml. of ice-water. The pH was adjusted to 8–9 by the addition of 16 g. of sodium hydroxide in 75 ml. of water, and the cold solution was extracted with three portions of ether. The combined extracts were dried over sodium sulfate and evaporated. The residue was dissolved in benzene and evaporated to remove residual pyridine. The glassy solid was dissolved in a small amount of ether and hexane was added to give a cloudy solution. The solution was cooled to yield 3.9 g. (70%) of crystals with M.P. 125–128°.

*Analysis.*—Calcd. for $C_{42}H_{71}NO_{15}$ (percent): C=60.78; H=8.62; N=1.69; O=28.91. Found (percent): C=60.83; H=8.70; N=1.70; O=28.88.

EXAMPLE 17

11-O-acetyl erythromycin B

A solution of 2.9 g. of 2′,11-di-O-acetyl-4″-O-formyl erythromycin B in 75 ml. of anhydrous methanol was allowed to stand at room temperature for 4 days. The solution was then evaporated to give 2.3 g. (87%) of solid product. This material was recrystallized from methanol-water giving fine needles, M.P. 100–105°.

*Analysis.*—Calcd. for $C_{39}H_{69}O_{13}N$ (percent): C=61.64; H=9.15; N=1.84; O=27.37. Found (percent): C=61.90; H=9.29; N=2.00; O=27.50.

EXAMPLE 18

2′,11-di-O-acetyl erythromycin B

11-O-acetyl erythromycin B (2.2 g.) was dissolved in 30 ml. of acetone and 0.8 g. of potassium carbonate and 1.5 ml. of acetic anhydride was added. The suspension was stirred at room temperature for 4 hours, then poured into an ice cold mixture of 5% sodium bicarbonate and ether. The ether layer was washed three times with 5% sodium bicarbonate and once with water. The solution was dried over sodium sulfate and evaporated to give 1.9 g. (82%) of glassy solid. This material could not be crystallized but slow evaporation of an ether-hexane solution gave a colorless powder, M.P. 105–110°.

*Analysis.*—Calcd. for $C_{41}H_{71}NO_{14}$ (percent): C=61.40; H=8.92; N=1.75; O=27.93. Found (percent): C=61.65; H=8.90; N=1.94; O=27.80.

EXAMPLE 19

2′,4″-di-O-Propionyl erythromycin A

To a solution of erythromycin A 7.3 g. (1 millimole) and 1,4-diazabicyclooctane [2,2,2] 7.3 g. (6.5 millimoles) dissolved in 100 ml. of dry ether is added 26 ml. (0.2 mole) of propionic anhydride. The resulting solution is stirred at room temperature for 48 hours, and then poured into 500 ml. of cold aqueous $NaCHO_3$ and 250 ml. ethyl ether. The ether layer is washed three times with cold aqueous $NaHCO_3$ and once with water. After this, the product is dried over $Na_2SO_4$ and the ether removed.

EXAMPLE 20

2′,4″-di-O-propionyl-11-O-acetyl erythromycin A

To 7.0 grams of product from Example 19 and 7.0 g. of 1,4-diazabicyclooctane [2,2,2] which are dissolved in dry ether is added 20 ml. (0.2 mole) of acetic anhydride. The resulting solution was allowed to stand at room temperature under a drying tube for 7 days. After this, the solution is poured into about 500 ml. of ice-water and 20 g. of NaOH in 100 ml. $H_2O$ added to give a pH of 8–9. The cold solution is then immediately extracted with ethyl ether and the combined extracts washed with aqueous $NaHCO_3$ and then water. The ether extract then dried over $Na_2SO_4$ and evaporated, leaving the product as a residue. The product is recrystallized from ether and collected.

EXAMPLE 21

4″-o-propionyl-11-O-acetyl erythromycin A

The product from Example 20 is dissolved in 100 ml. of methanol and 100 ml. of aqueous 5% $NaHCO_3$. The solution is stirred at room temperature for 24 hours. The methanol is removed under reduced pressure and the aqueous layer extracted twice with ether. The combined ether extracts are dried over $Na_2SO_4$ and the ether removed to yield the product.

EXAMPLE 22

2′,4″,11-trio-O-acetyl erythromycin A

To a solution of erythromycin A 7.3 g. (1 millimole) and 1,4-diazabicyclooctane [2,2,2] 7.3 g. (6.5 millimoles) dissolved in 100 ml. of dry ether is added 20 ml. (0.2 mole) of acetic anhydride. The resulting solution is allowed to stand at room temperature under a drying tube for 7 days. The mixture is then poured into 500 ml. of cold aqueous $NaHCO_3$ and 250 ml. ethyl ether. The ether layer is washed three times with cold aqueous $NaHCO_3$ and once with water. After drying over $Na_2SO_4$, the ether is removed to yield the product.

EXAMPLE 23

4″,11-di-O-acetyl erythromycin A

The product from Example 22 is dissolved in an equivolume mixture of methanol and aqueous 5% $NaHCO_3$. This solution is stirred for 24 hours. The methanol is removed under reduced pressure and the aqueous layer extracted twice with ethyl ether. The combined ether extracts are dried over $Na_2SO_4$ and the ether removed to yield the product.

EXAMPLE 24

2′-O-n-butyryl-4″,11-di-O-acetyl erythromycin A

To a suspension of 3 g. $K_2CO_3$ in a solution of 8 g. of product from Example 23 and 100 ml. of acetone, is added (25 millimoles) 4.1 ml. of n-butyric anhydride.

After stirring for 4 hours at room temperature, the mixture is poured into a cold solution of aqueous 10% $K_2CO_3$ and ethyl ether. The ether layer is washed twice with cold aqueous 5% $NaHCO_3$ and then once with water. After drying over $Na_2SO_4$ and removing the remaining solvent, the residue is recrystallized from cyclohexane and collected.

EXAMPLE 25

2′,4″-di-O-propionyl erythromycin B

Erythomycin B (5.0 g.) is dissolved in 125 ml. of pyridine and 6.8 ml. of propionic anhydride is added. The solution is allowed to stand under a drying tube for 3 days, then poured into about 500 ml. of ice-water. The pH is adjusted to from 8–9 by the addition of aqueous 25% NaOH, and the cold solution is extracted with two portions of ether. The combined extracts are dried over $Na_2SO_4$ and the ether removed. The residue is dissolved in benzene and the solution evaporated to remove any residual pyridine. The product is then recrystallized from ether.

EXAMPLE 26

4″-O-proionyl erythromycin B

The product from Example 25 is dissolved in andyhrous methanol and stirred at room temperature for 24 hours. The solution is evaporated to dryness and the residue product is crystallized from acetone.

EXAMPLE 27

2′,11-di-O-acetyl-4″-O-propionyl erythromycin B

A 5.0 g. portion of the product of Example 26 is dissolved in pyridine (125 ml.) and 20 ml. acetic anhydride is added. The solution is allowed to stand at room temperature under a drying tube for 7 days. The resulting mixture is then poured into about 599 ml. of ice-water and 20 g. of NaOH in 100 ml. $H_2O$ is added thereto. The cold solution is immediately extracted with three portions of ethyl ether and the combined extracts dried over $Na_2SO_4$ and the ether evaporated. The residue is dissolved in benzene and evaporated to remove residual pyridine. The solid product is taken up in ether and evaporated slowly to crystallize the product.

EXAMPLE 28

4‴-O-propionyl-11-O-acetyl erythromycin B

The product of Example 27 is dissolved in anhydrous methanol and allowed to stand at room temperature for 3 days. The solution is evaporated to dryness, and the product collected.

EXAMPLE 29

2′-O-iso-butyryl-4″-O-propionyl-11-O-acetyl erythromycin B

To a suspension of 3 g. $K_2CO_3$ in a solution of 8 g. of the product of Example 28 in 100 ml. of acetone is added (25 millimoles) 4.2 ml. of iso-butyric anhydride. After stirring for 4 hours at room temperature, the mixture is poured into a cold solution of aqueous 10% $K_2CO_3$ and ethyl ether. The ether layer is washed twice with cold aqueous 5% $NaHCO_3$, and then once with water. After drying over $Na_2SO_4$ and removing the remaining solvent, the residue is recrystallized from cyclohexane and collected.

EXAMPLE 30

2′,4″,11-tri-O-propionyl erythromycin A

To a solution of erythromycin A 7.3 g. (1 millimole) and 1,4-diazabicyclooctane [2,2,2] 7.3 g. (6.5 millimoles) dissolved in 100 ml. of dry ethyl ether is added 26 ml. (0.2 mole) of propionic anhydride. The resulting solution is allowed to stand at room temperature under a drying tube for 10 days. The mixture is then poured into 500 ml. of cold aqueous $NaHCO_3$ and 250 ml. ethyl ether. The ether layer is washed three times with cold aqueous $NaHCO_3$ and once with water. After drying over $Na_2SO_4$, the ether is removed to yield the product.

EXAMPLE 31

11-O-acetyl erythromycin A

To a solution of 1 millimole 4′-O-formyl erythromycin A and 6.5 millimole 1,4-diazabicyclooctane [2,2,2] dissolved in 100 ml. of dry ethyl ether is added 0.2 mole of acetic anhydride. The resulting solution is allowed to stand at room temperature under a drying tube for 7 days. After this, the solution is poured into about 500 ml. ice-water and 20 g. of NaOH in 100 ml. $H_2O$ is added to give a pH of 8–9. The cold solution is then immediately with ethyl ether and the combined extracts washed with aqueous $NaHCO_3$ and then water. The ether extract is then dried over $Na_2SO_4$, the ether evaporated, and the product, 2,11-di-O-acetyl-4′-formyl-erythromycin A collected.

This intermediate product is dissolved in 100 ml. of methanol and 100 ml. of aqueous 5% $NaHCO_3$. This solution is stirred at room temperature for 36 hours. The methanol is removed under reduced pressure and the aqueous layer extracted twice with ethyl ether. The combined ether extracts are dried over $Na_2SO_4$ and the ether removed to yield the final product.

EXAMPLE 32

11-O-formyl erythromycin A

To a solution of 1.0 millimole of erythromycin A dissolved in 250 ml. of dry ethyl ether and 5 ml. of pyridine is added at 0° C., 0.2 mole of formic acetic anhydride. The solution is stirred at 0° C. for 3 hours and then 25° C. for 6 days. The solution is again cooled to 0° C. and poured into cold 10% sodium carbonate. The ether layer is washed three times with cold 2% sodium bicarbonate and once with water. After drying over $Na_2SO_4$ and removing the residual ether, the product 2′,4″,11-tri-O-formyl erythromycin A is collected.

This intermediate product is dissolved in 600 ml. of methanol and kept at 25° C. for 6 days. The methanol is removed under reduced pressure and the residue recrystallized from ethyl acetate to yield the product.

The erythromycin esters of this invention have antibiotic activity against *Staphylococcus aureus* Smith. They are preferably administered to warm blooded animals orally in capsule or tablet form. The preferred dosage is from 25 to 600 mg./kg. of body weight administered three to four times a day. Capsules can contain, in addition to the ester, an inert filler such as lactose. Tablets are made in the usual manner. The esters can be tableted alone, but preferably a release agent such as magnesium stearate and a binder such as starch are also included in a blend prepared prior to tableting. Such a blend is as follows:

| | Percent by weight |
|---|---|
| Erythromycin ester | 77 |
| Magnesium stearate | 2 |
| Starch powder | 21 |

In Table I the NMR shifts of the compounds produced in Example 1–18 are set forth in confirmation of the empirical analytical results.

It should also be noted that the esters of this invention have present a sufficiently strong base, the 3′-di-methylamino, that these esters are capable of forming acid addition salts in the same manner as erythromycin. Of course, these salts can be used therapeutically only if the acid from which the salt is formed is physiologically acceptable. As the term "physiologically acceptable" is well understood in the art, an enumeration of the individual acids that can be used is unnecessary.

We claim:
1. A compound having the formula

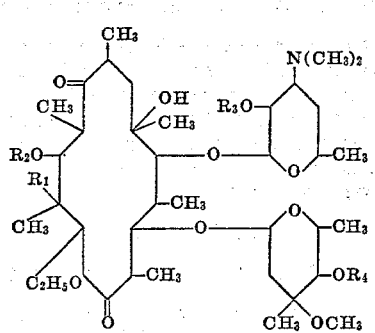

wherein $R_1$ is hydrogen or hydroxyl, and when $R_2$ is loweralkanoyl, $R_3$ and $R_4$ are hydrogen or loweralkanoyl; and when $R_2$ is hydrogen, $R_3$ is hydrogen and $R_4$ is loweralkanoyl.

2. A compound according to claim 1 in which $R_2$, $R_3$ and $R_4$ are loweralkanoyl.
3. A compound according to claim 1 in which $R_4$ is hydrogen and $R_2$ and $R_3$ are loweralkanoyl.
4. A compound according to claim 1 in which $R_3$ is hydrogen and $R_2$ and $R_4$ are loweralkanoyl.
5. 11-loweralkanoyl erythromycin.
6. 11-acetyl erythromycin.
7. 11-formyl erythromycin.

TABLE I

[NMR shifts of various ester groups in Hz.]

| Example No. | 2″-formyl | 4″-formyl | 11-formyl | 2′-acetyl | 4″-acetyl | 11-acetyl |
|---|---|---|---|---|---|---|
| 1 | | | | 124 | 127 | |
| 2 | | | | | 127 | |
| 3 | 488 | 491 | | | | |
| 4 | | 491 | | | | |
| 5 | | 492 | | 123 | | |
| 6 | | | | 124 | 126 | |
| 7 | | | | | 127 | |
| 8 | | | | 124 | 126 | 122 |
| 9 | | | | | 126 | 123 |
| 10 | 488 | 491 | 468 | | | |
| 11 | | 492 | 468 | | | |
| 12 | | | 467 | | | |
| 13 | 489 | 492 | | | | |
| 14 | | 492 | | | | |
| 15 | | 492 | | 123 | | |
| 16 | | 492 | | 123 | | 122 |
| 17 | | | | | | 123 |
| 18 | | | 124 | | | 123 |

References Cited

UNITED STATES PATENTS 3,629,232    12/1971    Jones      260—210 E

OTHER REFERENCES

Roczniki Chemii Ann. Soc. Chim. Polonorum, vol. 43, 763, 1969.

LEWIS GOTTS, Primary Examiner

J. R. BROWN, Assistant Examiner

U.S. Cl. X.R.

424—181